(12) United States Patent
Root et al.

(10) Patent No.: US 11,805,178 B2
(45) Date of Patent: *Oct. 31, 2023

(54) COMPUTER SYSTEM PROVIDING USER SPECIFIC SESSION PRELAUNCH FEATURES AND RELATED METHODS

(71) Applicant: CITRIX SYSTEMS, INC., Fort Lauderdale, FL (US)

(72) Inventors: Thomas Root, Redmond, WA (US); Christopher Coy Fife, Sammamish, WA (US); Jiayin Tian, Redmond, WA (US); Brian J Ehlert, Woodinville, WA (US); William Deforeest, Woodinville, WA (US); Christopher S Witeck, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,496

(22) Filed: Dec. 9, 2021

(65) Prior Publication Data

US 2022/0103640 A1  Mar. 31, 2022

Related U.S. Application Data

(63) Continuation of application No. 16/918,679, filed on Jul. 1, 2020, now Pat. No. 11,201,927, which is a continuation of application No. 15/720,183, filed on Sep. 29, 2017, now Pat. No. 10,721,316.

(51) Int. Cl.
*G06F 9/455* (2018.01)
*H04L 67/141* (2022.01)
*G06F 9/451* (2018.01)
*G06F 21/31* (2013.01)
*H04L 67/51* (2022.01)
*H04L 67/52* (2022.01)
*H04L 67/143* (2022.01)

(52) U.S. Cl.
CPC .......... *H04L 67/141* (2013.01); *G06F 9/452* (2018.02); *G06F 21/31* (2013.01); *H04L 67/143* (2013.01); *H04L 67/51* (2022.05); *H04L 67/52* (2022.05); *G06F 2009/45595* (2013.01)

(58) Field of Classification Search
None
See application file for complete search history.

(56) References Cited

U.S. PATENT DOCUMENTS

| 9,363,221 | B1 * | 6/2016 | Ozog | H04L 67/306 |
| 10,721,316 | B2 | 7/2020 | Root et al. | |
| 11,201,927 | B2 * | 12/2021 | Root | H04L 67/141 |
| 2014/0165164 | A1 * | 6/2014 | Pizurica | H04L 63/08 |
| | | | | 715/741 |
| 2014/0344420 | A1 * | 11/2014 | Rjeili | G06Q 10/109 |
| | | | | 709/227 |

(Continued)

*Primary Examiner* — Lance Leonard Barry (57) ABSTRACT

Methods and systems may include, at a computing device comprising a memory and a processor coupled to the memory, identifying entry of an electronic device within a geographic boundary and launching a session for a user of the electronic device in response to entry of the electronic device. The session may be inaccessible to the user at startup of the session. The method may further include, at the computing device, providing access to the session after startup of the session, and terminating the session based on exiting of the electronic device from the geographic boundary.

20 Claims, 9 Drawing Sheets

(56) References Cited

U.S. PATENT DOCUMENTS

| | | | | |
|---|---|---|---|---|
| 2014/0344446 A1* | 11/2014 | Rjeili | ............... | H04L 43/04 |
| | | | | 709/224 |
| 2016/0337346 A1* | 11/2016 | Momchilov | ............ | G06F 21/41 |
| 2017/0061750 A1* | 3/2017 | Eyring | ............... | G07C 9/28 |
| 2017/0228504 A1* | 8/2017 | Whitkin | ............... | G16H 10/60 |
| 2018/0217850 A1 | 8/2018 | Kolesnikov et al. | | |
| 2019/0018697 A1 | 1/2019 | Larsson | | |
| 2019/0034157 A1 | 1/2019 | Steinberg | | |
| 2019/0110158 A1 | 4/2019 | Schwartz | | |

* cited by examiner

COMPUTER SYSTEM PROVIDING USER SPECIFIC SESSION PRELAUNCH FEATURES AND RELATED METHODS

RELATED APPLICATIONS

This application is a continuation of U.S. application Ser. No. 16/918,679 filed Jul. 1, 2020 which is a is a continuation of U.S. application Ser. No. 15/720,183 filed Sep. 29, 2017, now U.S. Pat. No. 10,721,316, which is hereby incorporated herein in its entirety by reference.

TECHNICAL FIELD

This application generally relates to computer networks, and more particularly to creating and managing virtual computing sessions and related methods.

BACKGROUND

Traditionally, personal computers include combinations of operating systems, applications, and user settings which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A method may include, at a computing device comprising a memory and a processor coupled to the memory, identifying entry of an electronic device within a geographic boundary and launching a session for a user of the electronic device in response to entry of the electronic device. The session may be inaccessible to the user at startup of the session. The method may further include, at the computing device, providing access to the session after startup of the session, and terminating the session based on exiting of the electronic device from the geographic boundary.

In an example embodiment, the session may comprise an application configured to provide a schedule for the user while the electronic device is within the geographic boundary. In accordance with another example, the session may comprise an application configured to control at least one appliance located within the geographic boundary based upon proximity of the electronic device to the at least one appliance. More particularly, the at least one appliance may comprise at least one of a lighting controller and a projector, for example.

In an example implementation, providing access may comprise providing access to the session at a computing terminal within the geographic boundary. In some configurations, the electronic device may comprise a radio frequency identification (RFID) device, and identifying entry may comprise identifying entry of the RFID device within the geographic boundary based upon RFID communication with the electronic device. In another example configuration, identifying entry may comprise identifying entry of the mobile device within the geographic boundary based upon wireless communication. In some implementation, the computing device may be located outside of the virtual geographic boundary.

Another related method may include, at a computing device comprising a memory and a processor coupled to the memory, identifying entry of an electronic device within a geographic boundary, and pre-launching an application for a user of the electronic device in response to entry of the electronic device. The application may be inaccessible to the user at a time of startup of the application, and the application may be for controlling at least one appliance located within the geographic boundary. The method may also include, at the computing device, providing access to the application with use of the electronic device based upon proximity of the electronic device to the at least one appliance.

A related system may include an electronic device and a computing device configured to identify entry of the electronic device within a geographic boundary, and pre-launch a session for a user of the electronic device in response to identification of entry of the electronic device, with the session being inaccessible to the user at a time of startup of the session. The computing device may be further configured to provide access to the session after startup of the session, and terminate the session based on exiting of the electronic device from the geographic boundary.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
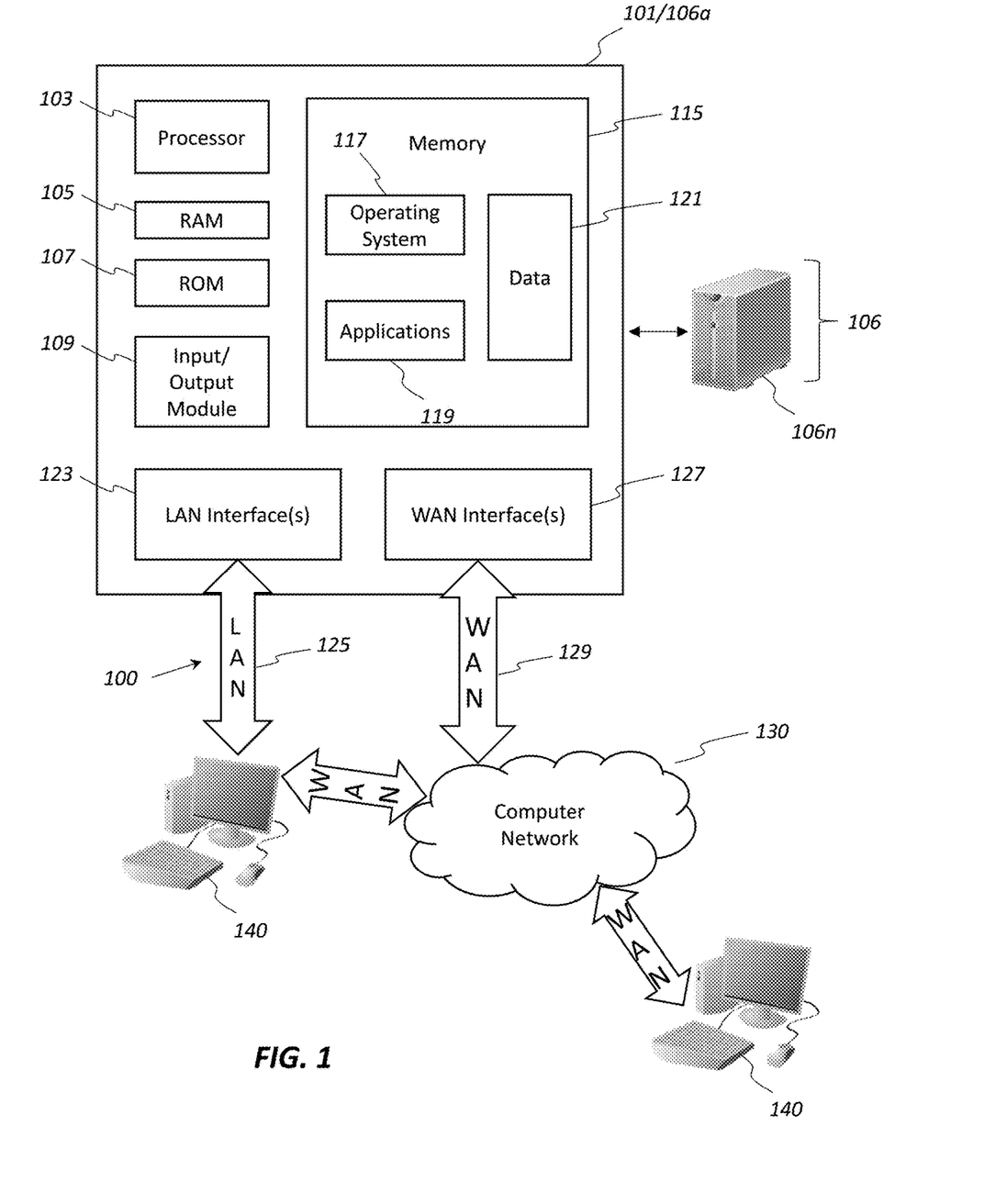
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, personal digital assistants (PDAs), notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
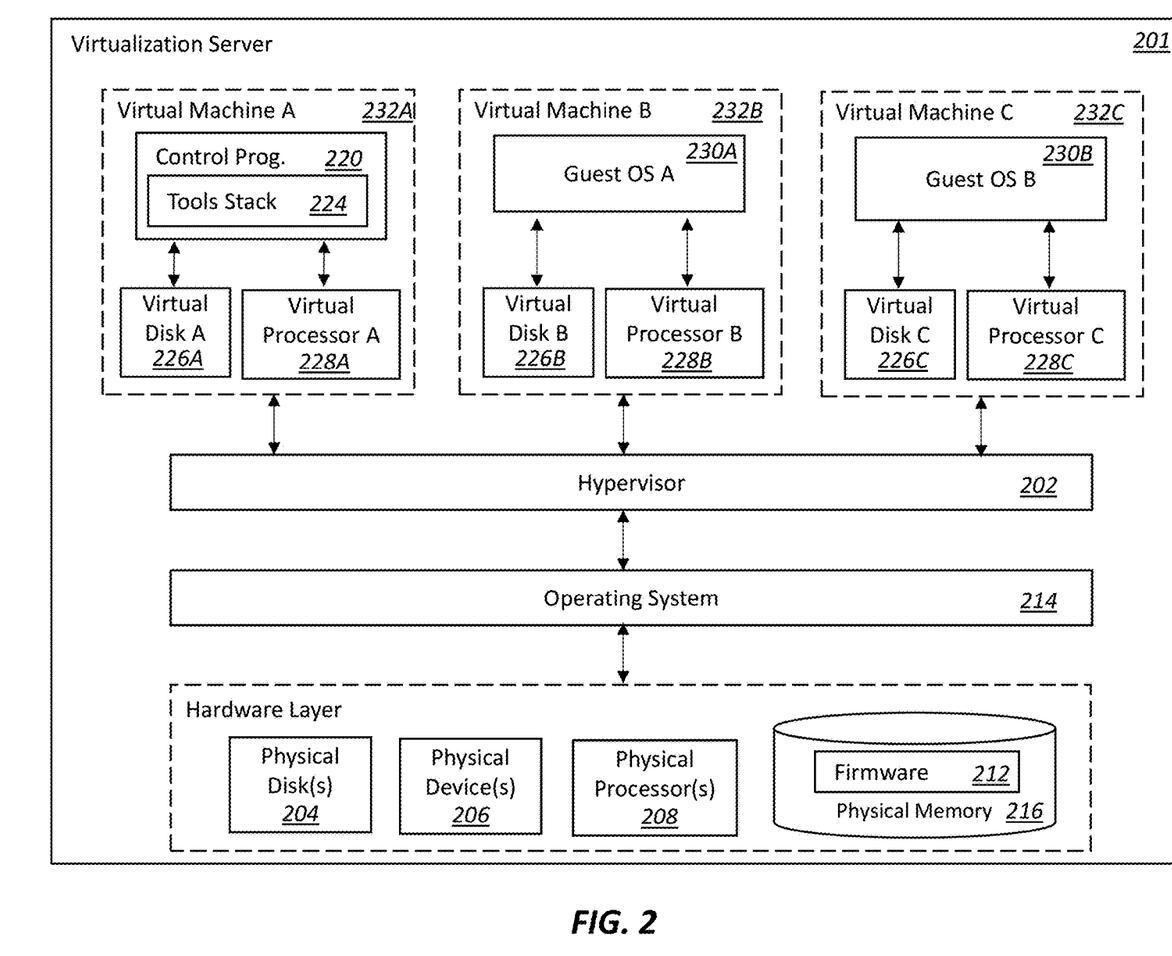
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
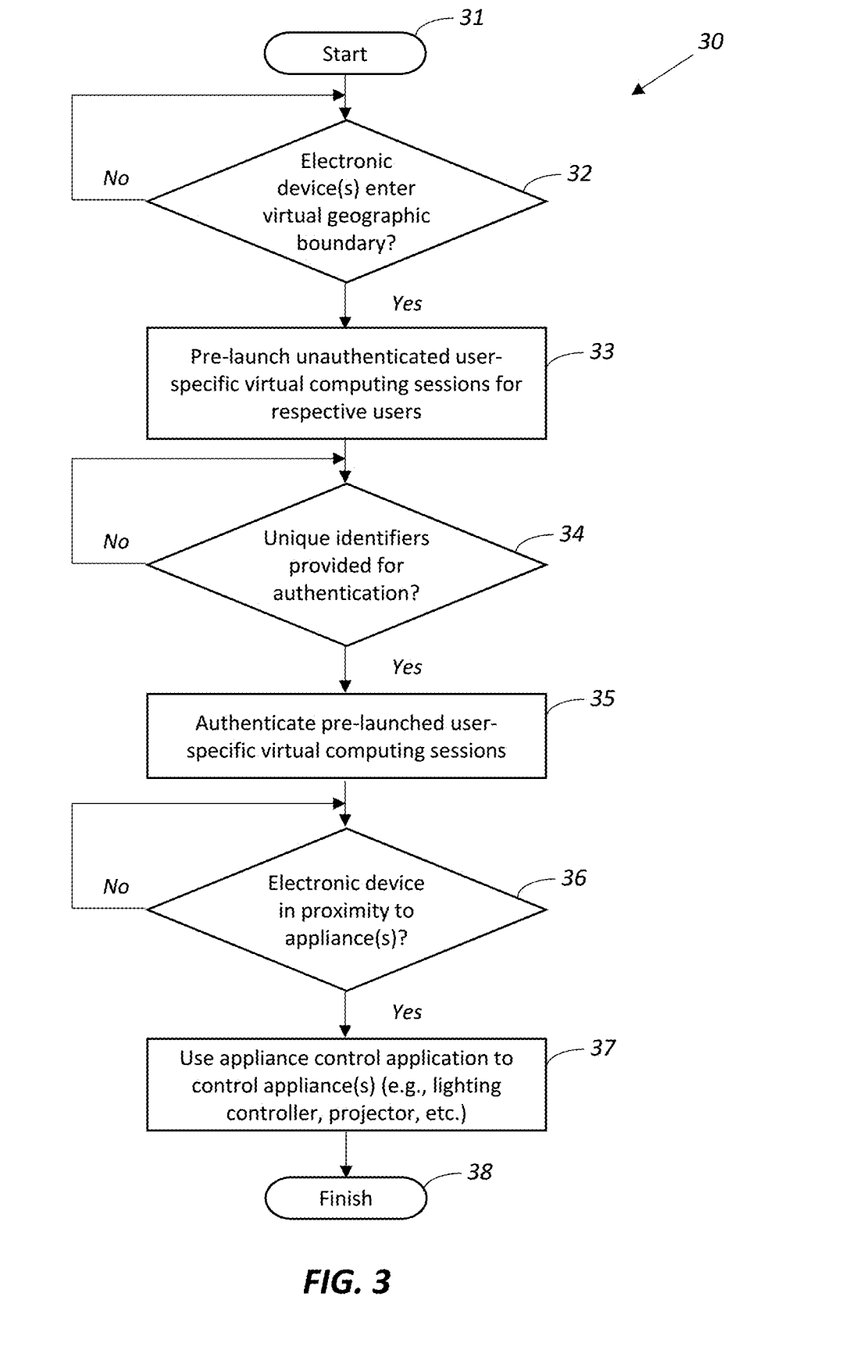
FIG. 3 is a flow diagram illustrating a method for pre-launching virtual computing sessions in accordance with an example implementation.
Figure 4:
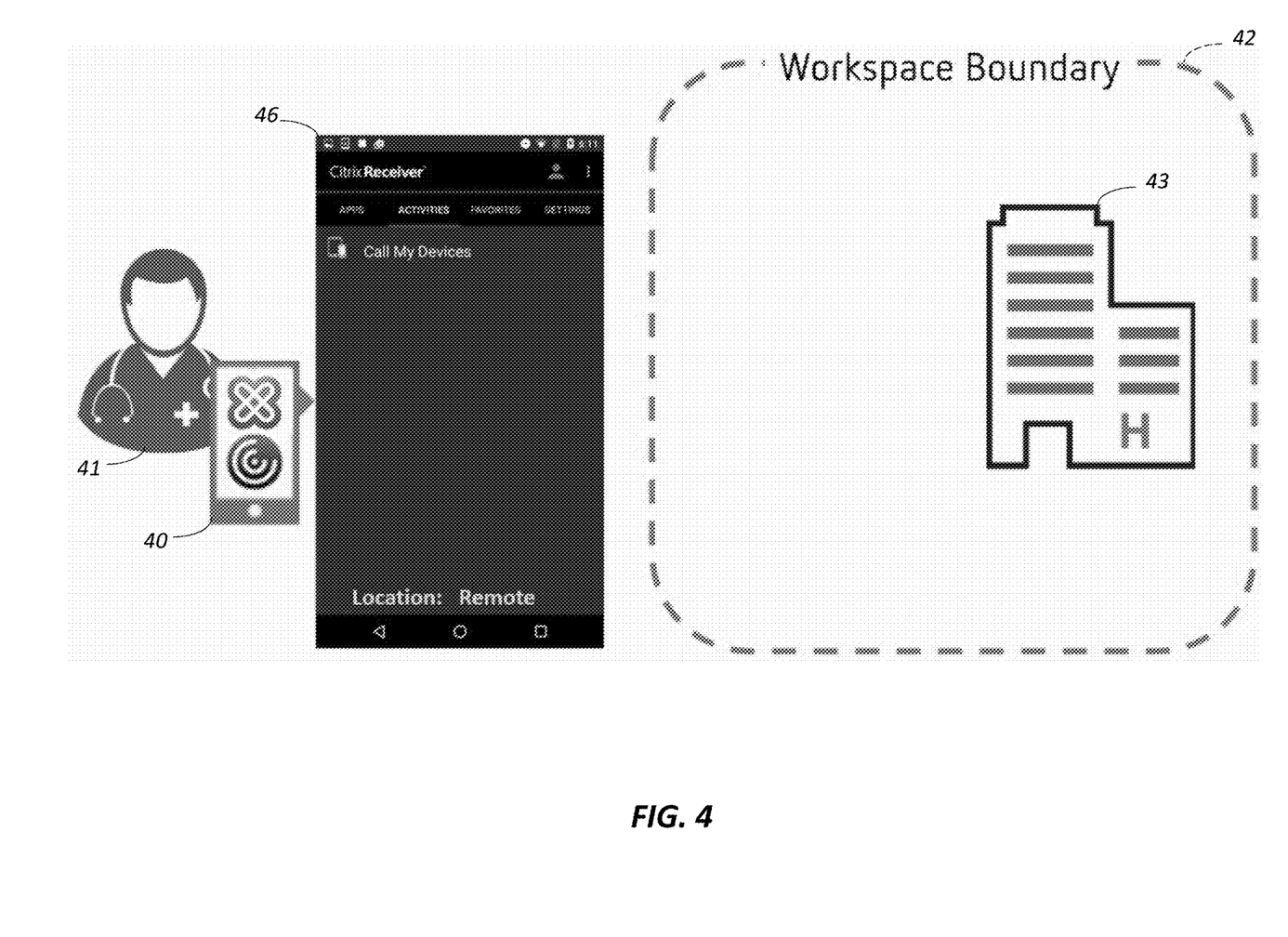
FIGS. 4-6 are a series of schematic block diagrams illustrating various aspects of the method of FIG. 3.
Figure 5:
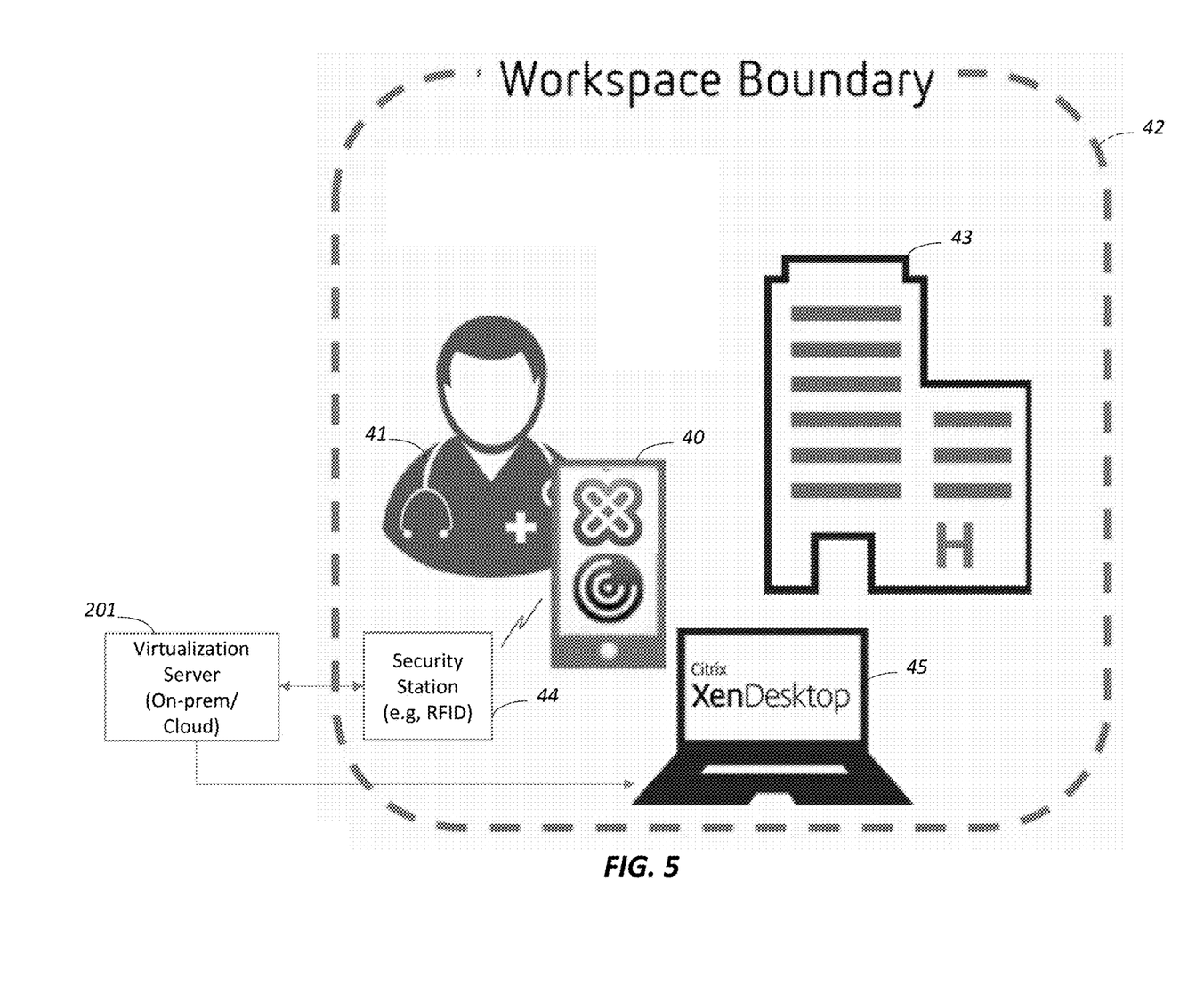

Turning now to the flow diagram 30 of FIG. 3 as well as FIGS. 4-8, an example implementation in which the virtualization server 201 may be used to pre-launch virtual computing sessions based upon a virtual geographic boundary (e.g., a geofence) and proximity is now described. Beginning at Block 31, the virtualization server 201 determines when electronic devices 40 associated with respective different users 41 enter within a virtual geographic boundary 42. In the illustrated example, the boundary surrounds a hospital 43, and the user 41 is a medical practitioner (e.g., doctor, nurse, etc.). However, it should be noted that the virtual geographic boundary 42 may be applied to other types of buildings, facilities, or other locations (with or without fixed buildings thereon). Also in the illustrated example, the electronic device 40 is a mobile wireless communications device (e.g., a smartphone or tablet computer). Such devices typically include an on-board satellite positioning system (e.g., GPS) receiver, allowing them to determine their own location and provide location information or a notification to the virtualization server 201 (e.g., via a cellular or other wireless network).

In such cases, the boundary 42 (e.g., geofence) may be adjusted in shape and size to provide desired lead time for pre-launching virtual computing sessions. For example, the shape may be irregular and set to incorporate specific roads, freeway exits, etc., where users will approach from. Moreover, the size may range from directly adjacent a given location (e.g., including just the parking lot of a building), to one or more miles away from the given location.

It should be noted that different types of electronic devices 40, and approaches for determining when they enter the boundary 42, may be used in different embodiments. For example, in some embodiments relatively short range wireless communications (e.g., RFID, NFC, Bluetooth, WiFi, etc.) may be used to identify the electronic device at a security station 44 located at an entrance to the boundary (e.g., a security desk, etc.). In the example illustrated in FIG. 5, the short range wireless device is incorporated in the mobile wireless communications device. However, in other embodiments the electronic device 40 may be a smart card (e.g., security badge), RFID token, etc. Furthermore, the use of third-party services such as Apple Pay, Google Wallet, etc., may be used to determine a given user have entered within the boundary 42. Other approaches to determining proximity may also be used, such as those described in U.S. Pat. No. 10,291,465 to Rjeili et al., which is also assigned to the present Assignee and is hereby incorporated herein in its entirety by reference.

As noted above, the virtualization server 201 is configured to run various types of virtual sessions for a plurality of client devices (e.g., virtual desktop sessions and/or virtual application sessions). In the example illustrated in FIG. 5, the virtualization server 201 operates virtual desktop and virtual application sessions (here XENDESKTOP and XENAPP sessions) at workstations 45 and the mobile wireless communications device 40. It should be noted that while a single virtualization server 201 is shown in the illustrated example, more than one such server may be used in some embodiments to provide a distributed virtualization environment, if desired.

In a typical virtualization environment, when a client device logs into the system, it requests one or more types of virtual sessions, and the virtualization server 201 would launch the requested session(s) responsive to the request. While the flexibility of accessing a virtual session from any different client device greatly simplifies the ability to work from anywhere, the virtual application launch process is different than a locally installed application. As such, there may be a delay or lag associated with launching of virtual application or desktop sessions as compared to a local device application or desktop. In particular, as virtualization servers typically may serve a very large number of users, the delay for requested sessions may be exacerbated during peak usage times (e.g., at the beginning of a work shift, etc.).

The virtualization server 201 may be an "on premises" ("on-prem") server which is located at a customer's facility. In this regard, a network gateway may be provided to interface the virtualization server 201 with cloud computing services, etc. By way of example, if the virtualization server 201 utilizes the above-noted XENAPP and/or XENDESKTOP deployment, the NetScaler Unified Gateway from Citrix Systems may be used for the network gateway, although other gateways may be used in different deployments. Another example implementation in which the virtualization server 201 is cloud-based and communicates with the client devices via a cloud network, in which no network gateway is required between the virtualization server and the cloud computing service. In either environment, startup of a virtual computing session may ordinarily take a relatively long time, as remote users may be required to manually load applications and data based upon location. For example, just the process of logging onto a remote desktop may take upwards of 5 to 10 minutes based upon the time of day and amount of other users accessing the system. Furthermore, cloud environments may accentuate this problem, and in some cases the amount of network traffic may cause start times to be double the typical average.

In accordance with an example implementation, the virtualization server 201 may advantageously pre-launch unauthenticated user-specific virtual computing sessions for respective users 41 based upon determining that the electronic devices for the respective users have entered within the virtual geographic boundary 42, at Blocks 32-33. That is, in accordance with the present approach, the virtualization server 201 may advantageously use GPS, proximity, NFC, RFID, token/key cards, pay devices (e.g., Apple Pay, Google Wallet), etc., to determine an individual's "intent to work", i.e., the desire of the user to enter within the boundary 42 (e.g., a workplace) and begin using one or more virtual computing sessions. With electronic devices such as smartphones, tablets, laptops, smart cards, etc., being core to most user's lifestyles, it may be assumed that the user associated with a given electronic device 40 has been authenticated to the device and is in fact with the particular user as that user approaches the boundary 42 (e.g., their respective work environments).

As such, once the virtualization server 201 is notified that a given user 41 is within the boundary 42 based upon the electronic device 40 associated with that user, the virtualization server 201 may accordingly create and start a user's particular desktop/app work environment (e.g., with the appropriate applications, permissions, data access levels, etc., assigned to that specific user). However, this is done in the background such that no user authentication is required to start the virtual desktop/apps. Yet, since these virtual sessions are starting in the background without authentication, they are not accessible for use, and therefore do not pose a security risk during this start up period.

The virtualization server 201 may then authenticate the pre-launched user-specific virtual computing sessions based upon unique identifiers associated with the respective users and the respective electronic devices 40 being within the virtual geographic boundary 42, at Blocks 34-35. That is, once the electronic device 40 is within the boundary 42 and the virtual computing session(s) for the user has been pre-launched, the respective user 41 may then authenticate or "claim" his or her specific pre-launched session by providing the respective unique identifier(s) (e.g., username, password, biometric, etc.) associated with that user. Here again, this may be provided on a workstation 45 (e.g., desktop or laptop computer), or other electronic devices 40 such as mobile wireless communications devices (smartphones, tablets, etc.), to enable a virtual desktop/app session(s).

As such, the virtualization server 201 may advantageously manage a user's expectations for a prompt start to virtual computing sessions based upon the determined "intent to work", allowing the virtualization server to start or "warm up" the environment so it is ready when the user is. Yet, the time consuming task of starting the virtual computing sessions has not changed (i.e., it still takes the same amount of time), but it is triggered and loaded before the user arrives based upon the above-described proximity detection so that to the user it appears as if the virtual computing session(s) is provided nearly instantaneously when he or she logs in to begin working.

Figure 6:
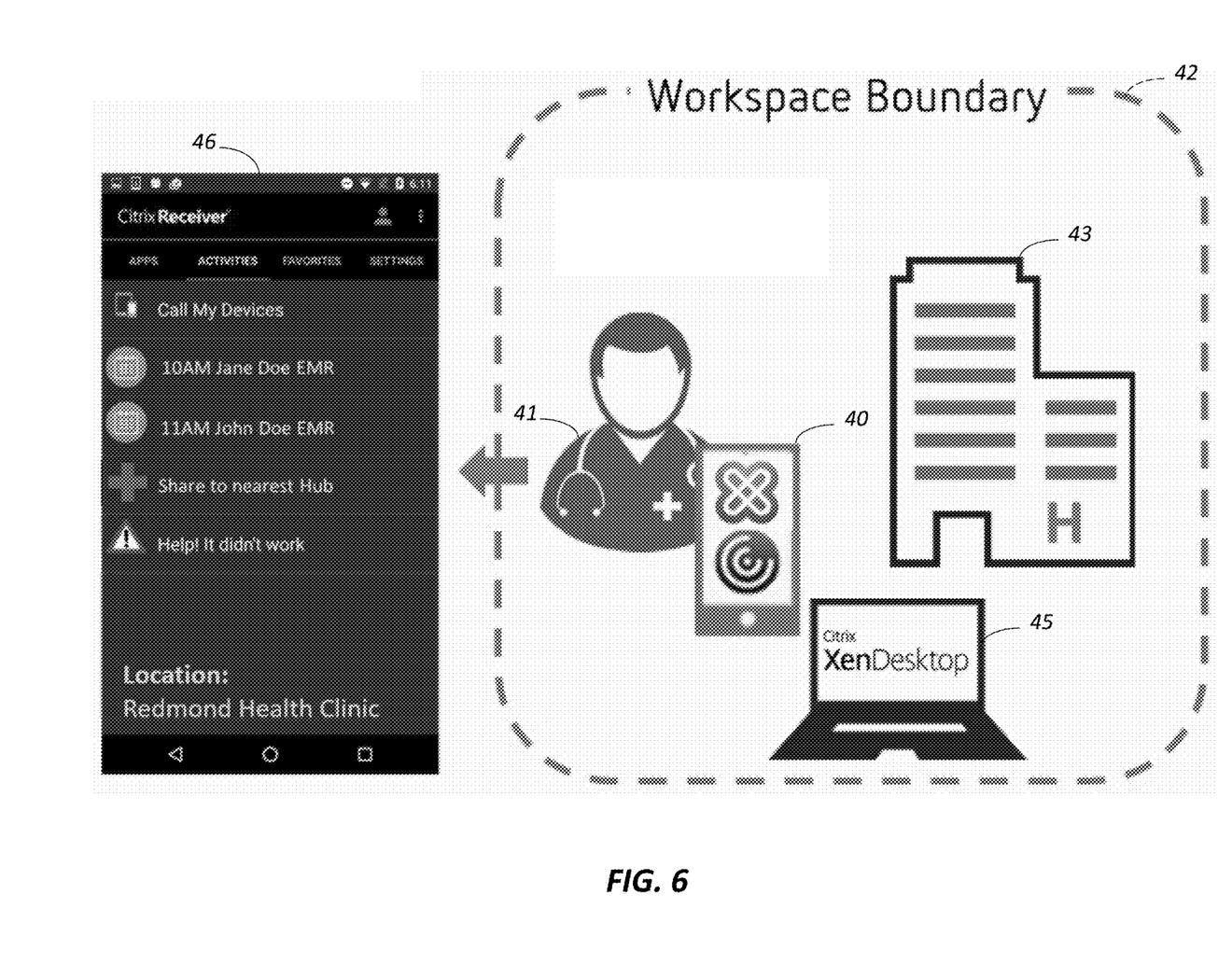
Figure 7:
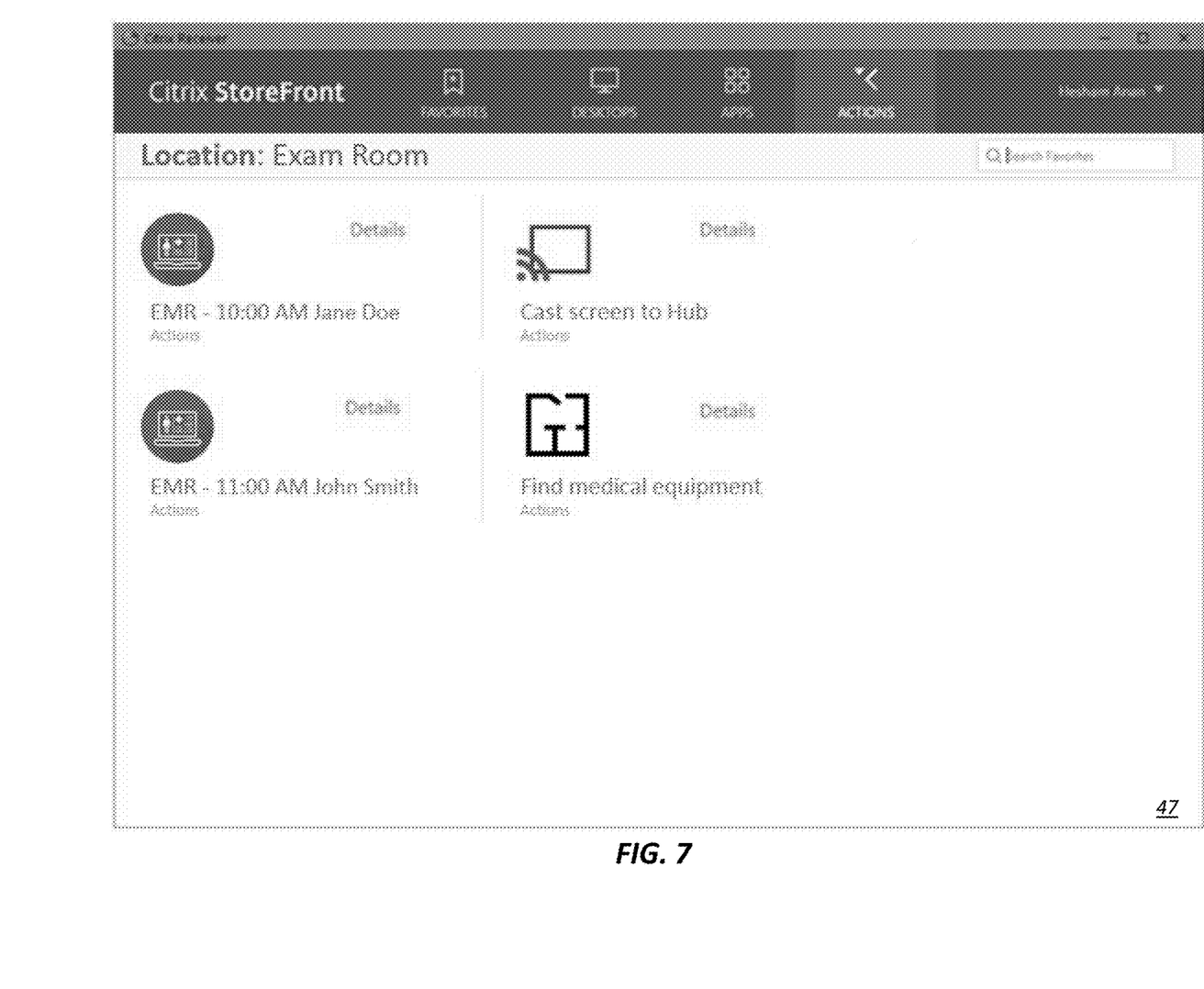
FIGS. 7 and 8 are display diagram illustrating example virtual computing sessions which may be pre-launched in accordance with the method of FIG. 3.
Figure 8:
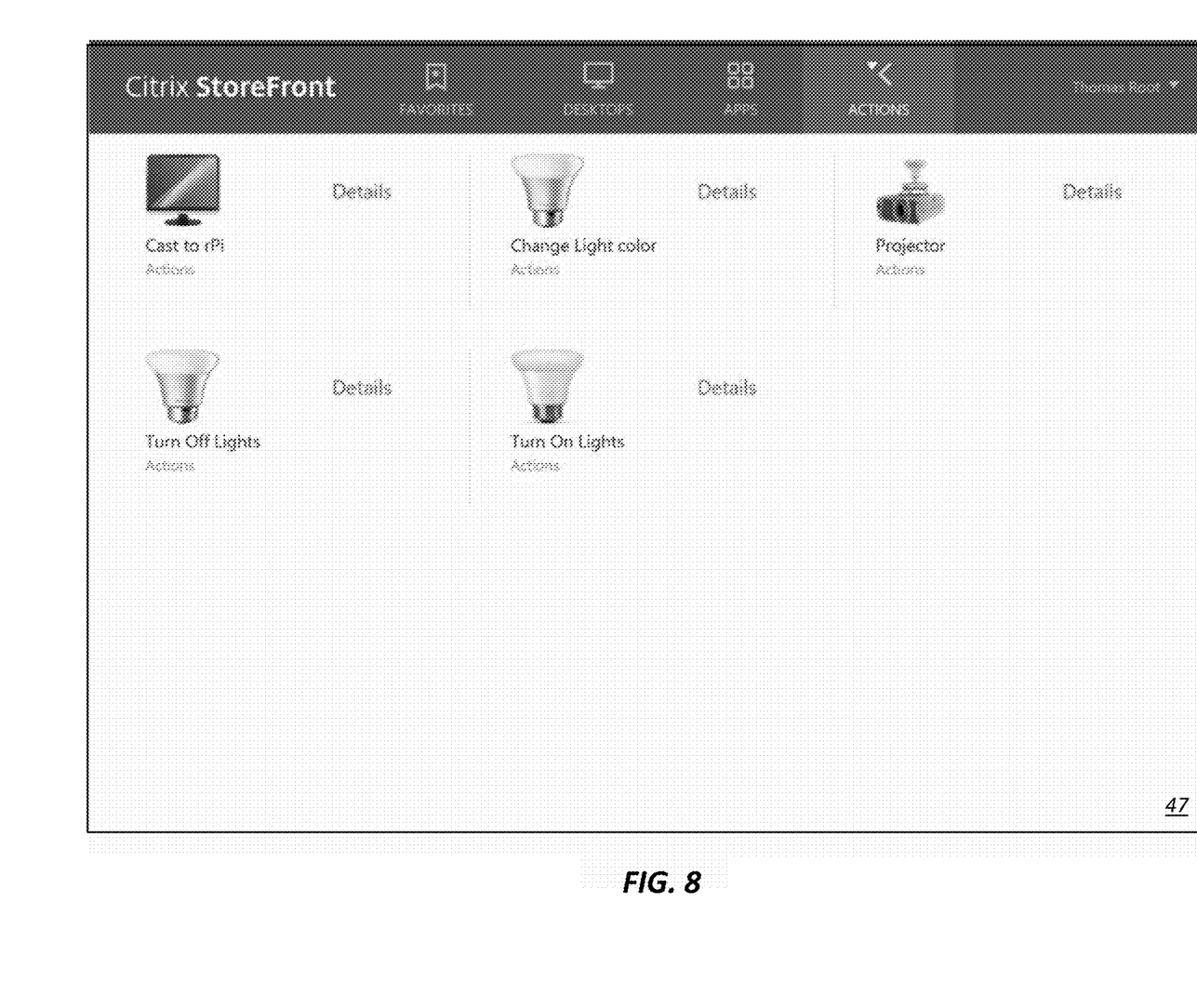

In the present example, one of the virtual applications launched for the user 41 is a scheduling app, which calls up the user-specific appointment schedule for the user for the current day, as shown on the display 46 of the mobile wireless communications device 40 in FIG. 6. Notice that in the view of FIG. 4, which is before the mobile device 40 enters the boundary 42, the display 46 is blank and does not display any scheduling information. That is, the virtual scheduling app has not been started at that point. It should be noted that the process described herein may also work in reverse, that is, when the user 41 leaves the boundary 42, any virtual computing sessions that have been authenticated and are running (such as the scheduling app) may be terminated (so the display 46 would return to the view shown in FIG. 4 upon exit of the user 41 from the boundary 42 around the hospital 43). In this example, the user 41 has appointments at 10 AM and 11 AM in the EMR. A display 47 for the workstation 45 is shown in FIG. 7, which provides another view of the calendar app for the user 41 at a desktop or laptop computer, for example.

In accordance with another advantageous aspect, one virtual application which may be provided to the user is an appliance control application configured to control one or more appliances located within the virtual geographic boundary 42 based upon proximity of the electronic device 40 to the appliance(s), at Blocks 36-37. In the example illustrated in FIG. 8, an app is provided on the display 47 appliance which allows the user 41 to control a room lighting controller and a projector, such as in a conference room, for example. That is, the user's proximity to the conference room may be detected based upon wireless communications (e.g., being within WiFi or Bluetooth range, RFID/NFC check in, etc.) with the electronic device 40, allowing the user 41 to control these device(s) when in proximity to (or within) the conference room (or other rooms/locations in different embodiments). In this regard, the conference room or other designated location becomes a subset of the boundary 42, which in some cases could be a geofence within a larger geofence. Other appliances or devices may be controlled in different embodiments as well.

In some embodiments, start and end of day events may be used to manage workloads and data consumption on a demand basis, versus always on or scheduled on. This may reduce cloud runtime costs by managing the operations closer to the intent to work. Furthermore, multiple data points may be used to provide a clearer picture as to the workforce patterns of work and usage of defined resources.

Figure 9:
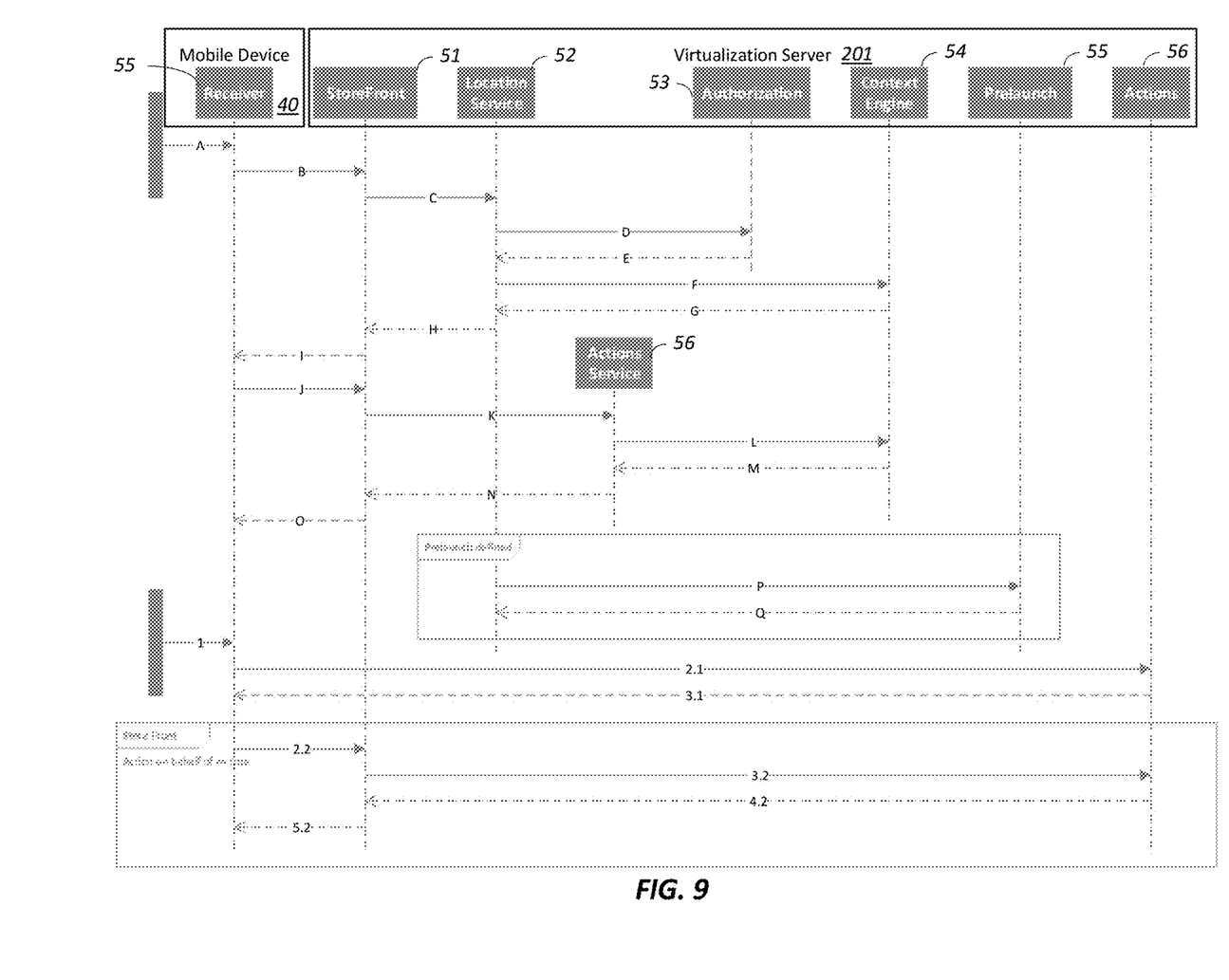
FIG. 9 is a flow diagram illustrating a process flow for an example implementation of a virtual computing session pre-launch configuration.

Referring additionally to FIG. 9, the foregoing will be further understood with reference to an example implementation which utilizes Citrix Receiver on the mobile devices 40, and Citrix Server components 51-56 at the virtualization server 201. More particularly, the Citrix Server components include a StoreFront interface 51, location service 52, authorization service 53, context engine 54, session prelaunch service 55, and actions service 56. In this example, as the mobile device 40 approaches the boundary 42, the mobile device will notify, through Receiver 50, where it is. In turn StoreFront 51 will reply with one or more geofences and/or beacons that the mobile device 40 should monitor for entry/exit events.

When a geofence has be entered, Receiver 50 may notify the Location Service 52 and take the information provided. By way of example, this may include a user identifier, which is a user specific string that is obfuscated for transport but is traded for a user Unique Principal Name (UPN) during the authorization process. This may also include an event-type, such as the following:

Enter: When a fence/proximity has been tripped going toward (outside to inside) the workplace, a RFID badge reader activated.

Exit: When leaving workplace.

Out-of-Range: when proximity had been detected, but is not no longer visible.

Location ID. This is the ID of defined geofence or proximity beacon. On startup this may be the geographical coordinates of the current position. With the use of near-real-time location/proximity data, the services used may become event driven versus time of day/schedule driven, and only resources required for the user whose intent to work is made available. More particularly, current resources are scheduled to be on/off and are not specific directly to individual users, whereas with the intent to work, resources are allocated based upon the users being about to work so their specific resources are managed during their workday. So, a workload is started on the Enter event and ended at the Exit event. By using proximity, this allows for the use of dynamic actions, applications or data based upon the person, location, state, and/or time of day.

The workflow shown in FIG. 9 depicts an example message flow which may be used to select context and location aware resources, give Receiver 51 actionable items that the user may select. The location service 52 is a service that provides geo-coordinate processing to retrieve relevant data, such as geofence definitions and proximity details that are based upon where it is located. The actions service 56 provides contextual actions that are presented in Receiver 51 that a user can select. The actions may be based upon location, proximity, identity and relation to other actions. The authorization service 53 takes the obfuscated identity string provided and returns the users UPN that is used by the authentication plugin 53 that will trade the UPN for an interactive logon token.

The context engine 54 maintains the state of all interesting objects and their relationships to each other. It includes people, places, things, actions, time and how they relate. The prelaunch service 55 receives an Independent Computing Architecture (ICA) file that is used to start/logon to a published XENDESKTOP, and then puts the session into a disconnected state so the Receiver 50 may perform session roaming versus a full logon to present the user with a live desktop in shorter periods of time, as noted above. The actions service 56 organizes the set of contextual actions provided by the context engine 54 and merges the data together for Receiver 50 to present to the user. These actions are dynamic depending upon certain factors.

The following is a description of the steps shown in FIG. 9, which are labeled with the corresponding label from the diagram.

A. User starts and authenticates using Citrix Receiver 50.

B. Receiver 50 sends initial geo-coordinate information, which may include:
  a. Longitude, Latitude, and Altitude;
  b. User identifier, this is an obfuscated string that represents the user; and/or
  c. Event Type (enter/exit/out-of-range).

C. StoreFront 51 forwards geo-coordinate information to Location Services 52, which may include data received from B. above.

D. Location service 52 requests validation for authorization from authorization service 53, which may include the user identifier.

E. Returns UPN to the location service 52 upon success.
F. Request for geofence data to the context engine 54, which may include:
   a. Longitude, Latitude, and Altitude;
   b. UPN; and/or
   c. EventType.
G. The context engine 54 returns a 'JSON' object including all currently interesting data, such as:
   a. geofence(s); and/or
   b. Proximity beacon(s).
H. Replying with G's data to StoreFront 51.
I. Replying with G's data to Receiver 50. Receiver 50 will not parse the data and clear all location settings and reset to current data set. Since this is a clear and set, all previously held data is no longer scanned for.
J. Receiver 50 detects a boundary crossing, which may include:
   a. Location ID/Proximity ID;
   b. User Token; and/or
   c. Event Type.
K. StoreFront 51 forwards the data to the Actions Service 56.
L. Action Service 56 requests contextual data from the context engine 54 based upon the data provided.
M. The context engine 54 returns with current data sets. Dynamic actions may be based upon where/when/who.
N. The actions service 56 may use NFUSE (or other interface software) to coalesce data into CML and return the info.
O. StoreFront 51 transforms the data into HTML and adds to the available actions tab.
P. If a desktop session(s) is to be pre-launched, this step represents the request for the virtual computing sessions being made (Block 60).
Q. The prelaunch service 55 returns the success/failure of the pre-launched desktop, which is now in a disconnected state.

The following steps occur after the session(s) prelaunch.
1. User selects an action via Receiver 50.
2.1. Using a Cross-Origin Resource Sharing (CORS) interface, Receiver 50 directly contacts the external actions service 56 to request the action to be performed. This is an asynchronous call, and is considered send and forget so no message is returned except to say the call was successful made.
2.2. Receiver 50 requests StoreFront 51 to perform the action.
3.2. StoreFront 51 requests the action to be taken.
4.2. Depending on the interface, this step may or may not occur. If a return message is applied it may include updated information to change the state and/or remove more actions based upon the change.
5.2. Receiver 50 displays the updates by HTML.

The process of identifying a user, which is currently via a token/badge ID, may have different resolvers based upon configuration. A security company such as Impravata may be used to validate the identity and provide a UPN upon success. This process may also be performed by XENMOBILE, Microsoft Intune, or another identity management system. By collecting event data points, a Machine Learning (ML) algorithm may be used to manage and track usage of many resources including Desktop, Application, Office Space, Devices and any component added to the context engine 54, for example.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That invention claimed is:

1. A method comprising:
   at a computing device comprising a memory and a processor coupled to the memory:
      identifying entry of an electronic device within a geographic boundary;
      launching a session for a user of the electronic device in response to entry of the electronic device, the session being inaccessible to the user at startup of the session; and
      providing access to the session after startup of the session, and terminating the session based on exiting of the electronic device from the geographic boundary.

2. The method of claim 1 wherein the session comprises an application configured to provide a schedule for the user while the electronic device is within the geographic boundary.

3. The method of claim 1 wherein the session comprises an application configured to control at least one appliance located within the geographic boundary based upon proximity of the electronic device to the at least one appliance.

4. The method of claim 3 wherein the at least one appliance comprises at least one of a lighting controller and a projector.

5. The method of claim 1 wherein providing access comprises providing access to the session at a computing terminal within the geographic boundary.

6. The method of claim 1 wherein the electronic device comprises a radio frequency identification (RFID) device; and wherein identifying entry comprises identifying entry of the RFID device within the geographic boundary based upon RFID communication with the electronic device.

7. The method of claim 1 wherein identifying entry comprises identifying entry of the mobile device within the geographic boundary based upon wireless communication.

8. The computing device of claim 1 wherein the computing device is located outside of the virtual geographic boundary.

9. A method comprising:
   at a computing device comprising a memory and a processor coupled to the memory:
      identifying entry of an electronic device within a geographic boundary;
      pre-launching an application for a user of the electronic device in response to entry of the electronic device, the application being inaccessible to the user at a time of startup of the application, and the application for controlling at least one appliance located within the geographic boundary; and
      providing access to the application with use of the electronic device based upon proximity of the electronic device to the at least one appliance.

10. The method of claim 9 wherein the application is for providing a schedule for the user while the electronic device is within the geographic boundary.

11. The method of claim 9 wherein the at least one appliance comprises at least one of a controller and a projector.

12. The method of claim 9 wherein the electronic device comprises a radio frequency identification (RFID) device; and wherein identifying entry comprises identifying entry of the RFID device within the geographic boundary based upon RFID communication with the electronic device.

13. The method of claim 9 wherein identifying entry comprises identifying entry of the electronic device within the geographic boundary based upon wireless communication.

14. The method of claim 9 wherein the computing device is located outside of the virtual geographic boundary.

15. A system comprising:
an electronic device; and
a computing device configured to
identify entry of the electronic device within a geographic boundary,
pre-launch a session for a user of the electronic device in response to identification of entry of the electronic device, the session being inaccessible to the user at a time of startup of the session, and
provide access to the session after startup of the session, and terminate the session based on exiting of the electronic device from the geographic boundary.

16. The system of claim 15 wherein the session comprises an application configured to provide a user-specific schedule for the user while the electronic device is within the geographic boundary.

17. The system of claim 15 wherein the session comprises an appliance control application configured to control at least one appliance located within the geographic boundary based upon proximity of the electronic device to the at least one appliance.

18. The system of claim 15 wherein the computing device provides access to the session at a computing terminal within the geographic boundary.

19. The system of claim 15 wherein the electronic device comprises a radio frequency identification (RFID) device; and wherein the computing device identifies entry of the RFID device within the geographic boundary based upon RFID communication with the electronic device.

20. The system of claim 15 wherein the electronic device comprises a mobile wireless communications device; and wherein the computing device identifies entry of the mobile wireless communications device within the geographic boundary based upon wireless communication with the mobile wireless communications device.

* * * * *